(12) United States Patent
Bailey

(10) Patent No.: US 7,191,536 B1
(45) Date of Patent: Mar. 20, 2007

(54) DEVICE AND METHOD FOR GRIPPING, HOLDING AND MEASURING A FISH

(75) Inventor: Ken D Bailey, Grain Valley, MO (US)

(73) Assignee: KB Innovations, LC, Grain Valley, MO (US)

( * ) Notice: Subject to any disclaimer, the term of this patent is extended or adjusted under 35 U.S.C. 154(b) by 0 days.

(21) Appl. No.: 11/406,092

(22) Filed: Apr. 18, 2006

(51) Int. Cl.
*G01B 5/02* (2006.01)

(52) U.S. Cl. .............................. 33/511; 33/485; 33/549; 43/4

(58) Field of Classification Search .................. 33/511, 33/483–485, 489, 549, 492–494, 348; 43/1, 43/4
See application file for complete search history.

(56) References Cited

U.S. PATENT DOCUMENTS

| 3,259,988 | A | | 7/1966 | Lunn |
|---|---|---|---|---|
| 5,097,617 | A | | 3/1992 | Craven |
| 5,148,607 | A | | 9/1992 | Lasiter |
| D337,062 | S | | 7/1993 | Sanders |
| D348,405 | S | | 7/1994 | Storey et al. |
| 5,339,532 | A | * | 8/1994 | O'Keefe ..................... 33/511 |
| 5,526,575 | A | | 6/1996 | Hoover et al. |
| 5,637,838 | A | * | 6/1997 | Arey et al. .................. 33/485 |
| 6,256,896 | B1 | * | 7/2001 | Landauer .................... 33/512 |
| 6,765,155 | B1 | * | 7/2004 | Gray ........................... 33/511 |
| D506,398 | S | | 6/2005 | Bunkowfst |
| 2005/0241167 | A1 | | 11/2005 | Goodwin |

* cited by examiner

*Primary Examiner*—Yaritza Guadalupe-McCall
(74) *Attorney, Agent, or Firm*—David E Herron, II

(57) ABSTRACT

The disclosure describes a fish measuring device and method.

18 Claims, 4 Drawing Sheets

DEVICE AND METHOD FOR GRIPPING, HOLDING AND MEASURING A FISH

BACKGROUND OF THE INVENTION

Fishing is an age-old pastime for people of all ages and walks of life. Not only is fishing an extremely popular recreational activity, it serves as a profession or vocation for many. In short, millions of people fish for one reason or another.

There are numerous rules and regulations that pertain to fishing. For example, each state has detailed regulations regarding licensing of anglers, as well as the regulation of the species, size and number of fish that may be kept.

In order for an angler to determine whether a particular fish may be kept, it is frequently necessary to accurately measure its length. This is a task that may be cumbersome, especially when a fish is lively and tossing about. A rough estimate that ends up being inaccurate may end up subjecting the angler to costly fines and/or the loss of fishing privileges.

The invention is a device and method to assist an angler in the often-cumbersome task of measuring a caught fish.

SUMMARY OF THE INVENTION

The invention is both a device and a method for measuring a fish.

The Inventive Device

The inventive device includes a base providing a fish-support surface. The base has a width that is tapered along its longitudinal axis such that its first end of the base is broader than the second end of the base. A stop is adjacent the second end of the base, and an opening for inserting the fish at the first end.

The device also includes a pair of side walls that extend upwardly from a respective side edge of the base. The side walls terminating in an upper wall that is configured generally parallel to and displaced from the base, thereby forming a space therebetween. This space is where the fish is inserted for measurement, so it should be formed to be large enough so as to enable the fish to fit in the space.

The upper wall of the device has a first portion positioned to extend over an area adjacent the first end of the base, and a second portion that extends over an area adjacent to the second end of the base. The device also includes an opening at the second end of the base.

The device also has a channel extending from the opening and through the first portion of the upper wall and generally parallel the longitudinal axis. A pliable tab extends from the second portion of the upper wall and into the channel.

In order to measure a fish, it is inserted (usually head-first) into the opening, then manually urged through the channel until the fish abuts the stop. The pliable tab is then downwardly depressed to engage and restrain the fish enabling an accurate measurement.

Optionally, the base will bear one or more marks at preselected distances from the stop. Additionally, the device may have a gap between the upper wall and the stop in order to allow drainage. In that regard, holes may be positioned in the base in order to allow drainage as well.

The first end of the base may also have a flap extending therefrom and an aperture formed therein. This flap and aperture combination may allow the device to be secured to a hanger, such as a hook or nail.

The Inventive Method

The inventive method will require a fish-support surface comprising a base with a tapered width along a longitudinal axis such that its first end of the base is broader than the second end of the base. The inventive method will also include the step of positioning a stop adjacent the second end of the base, and extending a pair of side walls upwardly from the base such that each respective side wall emanates from a respective side edge of the base and terminates in an upper wall generally parallel to and displaced from the base to form a space therebetween.

The inventive method will also include the step of forming an upper wall forming the upper wall having first and second portions that extend over the first and second ends of the base, respectively. Additionally, a channel is formed on the first portion of the upper wall and extends along the first portion of the upper wall generally parallel to the longitudinal axis of the device.

The inventive method also includes the step of positioning a pliable tab extending from the second portion of the upper wall and into the channel. Also, the method will require insertion of the fish into the opening adjacent the first end of the base, then urging the fish through the channel until the fish abuts the stop. Next, one depresses the pliable tab downwardly to engage and restrain the fish so that it can be measured.

In a preferred embodiment, the base has markings at preselected distances from the stop so that the length can be visually determined. Also holes and gaps may be formed at various locations of the walls and base in order to facilitate drainage.

In yet another preferred embodiment, the method may include the steps of extending a flap from the first end of the base, then placing an aperture in the flap and hanging the device by engaging a hanger (i.e., a hook or a nail) within the aperture.

The foregoing summary gives background of the invention so that its best mode of use can be generally understood. The specific details of the invention, however, will be better understood when described in conjunction with the following drawings.

DETAILED DESCRIPTION OF THE PREFERRED EMBODIMENTS

Figure 1:
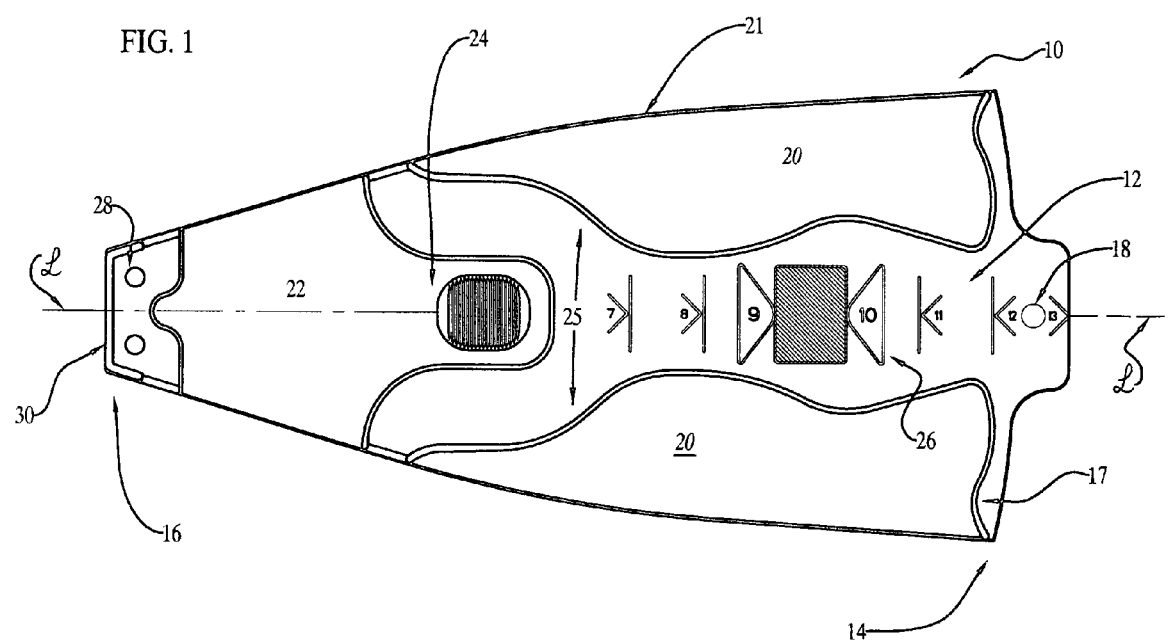
FIG. 1 shows a plan view of the fish measuring device, according to the principles of the invention.

FIG. 1 shows a detailed plan view of the inventive device 10. The device 10 comprises a base 12 that bears a taper from its enlarged first end 14 to its narrower second end 16. An opening 17 is at the first end 14, and a stop 30 is at the second end 16.

Still referring to FIG. 1, the upper wall 21 includes a first portion 20 that extends over the base 12 in an area adjacent its first end 14. The upper wall 21 also includes a second portion 22 that extends over the base 12 adjacent in an area adjacent the first end 16. A channel 25 extends along the first portion 20 of the upper wall 21 from the opening 17 at the first end 14 of the device 10 and generally parallel to the longitudinal axis L toward second portion 22 of the upper wall 21.

As shown in FIG. 1, a tab 24 extends from the second portion 22 of the upper wall 21 and into the channel 25. As shown hereinafter, the tab 24 is pliable so that it can be depressed downwardly to restrain and retain a measured fish. As shown, it is preferred that the tab 24 be textured in order to prevent slippage. The base 12 of the device 10 bears markings 26 at preselected distances from the stop 30 to enable visual measurement of a fish (shown aft). As shown, the markings 26 may include an easy read box formed between designated distances from the stop 30. In order to allow fluids to drain from the device, holes 28 may be positioned on the base 12.

Figure 2:
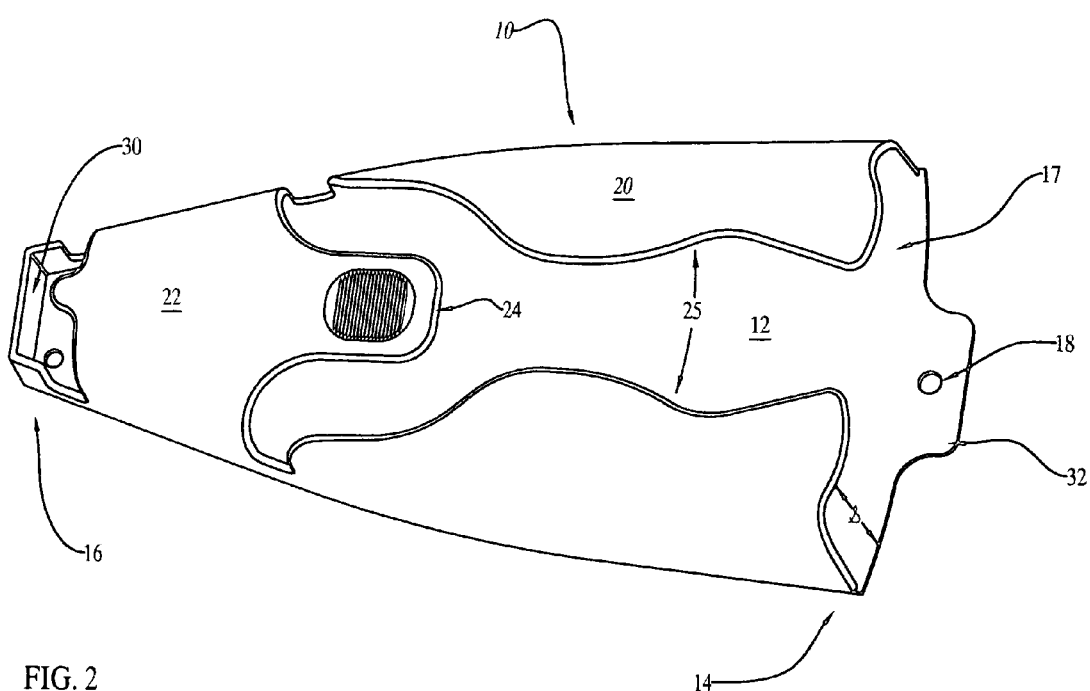
FIG. 2 is a perspective view of the fish measuring device.

FIG. 2 shows a perspective view of the embodiment of the device 10. The opening 17 at the first end 14, and the space S should be formed of sufficient size to enable a fish to be easily inserted therein. The channel 25 should likewise be formed of sufficient width so as to enable one to manually urge a fish from the opening 17 at the first end 14 until it abuts the stop 30 at the second end 16.

Still referring to FIG. 2, the base 12 includes a flap 32 extending from the first end 14 of the device, and an aperture 18 is positioned within the flap. The flap 32 and aperture 18 are cooperatively configured to enable the device 10 to hang from a nail or hook (not shown).

Figure 3A:
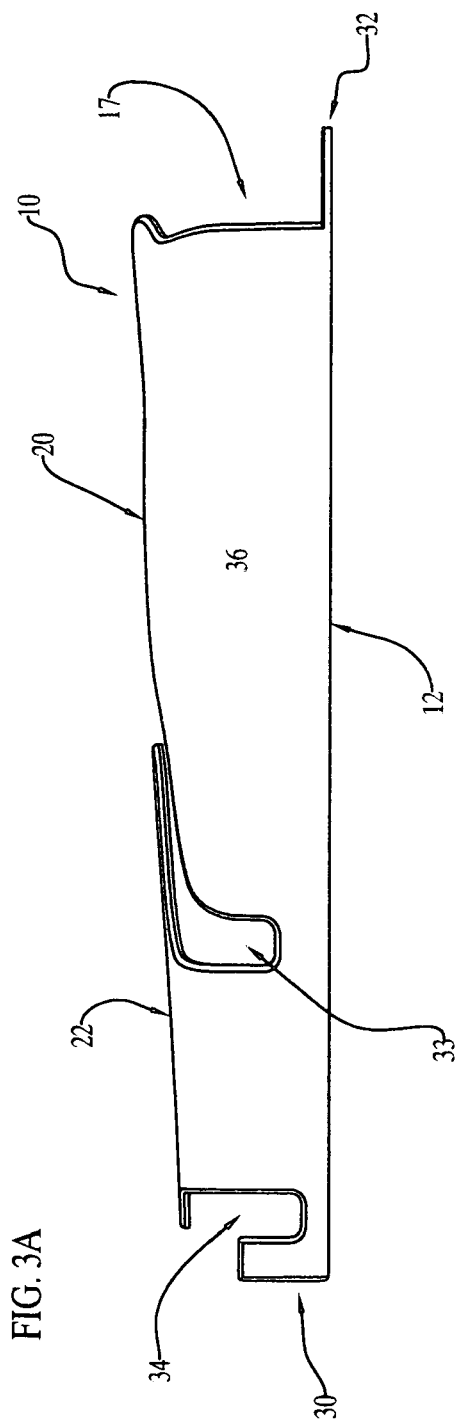
FIGS. 3A and 3B are comparative side views of the fish measuring device showing the pliable tab in a relaxed position and a deflected position, respectively.
Figure 3B:
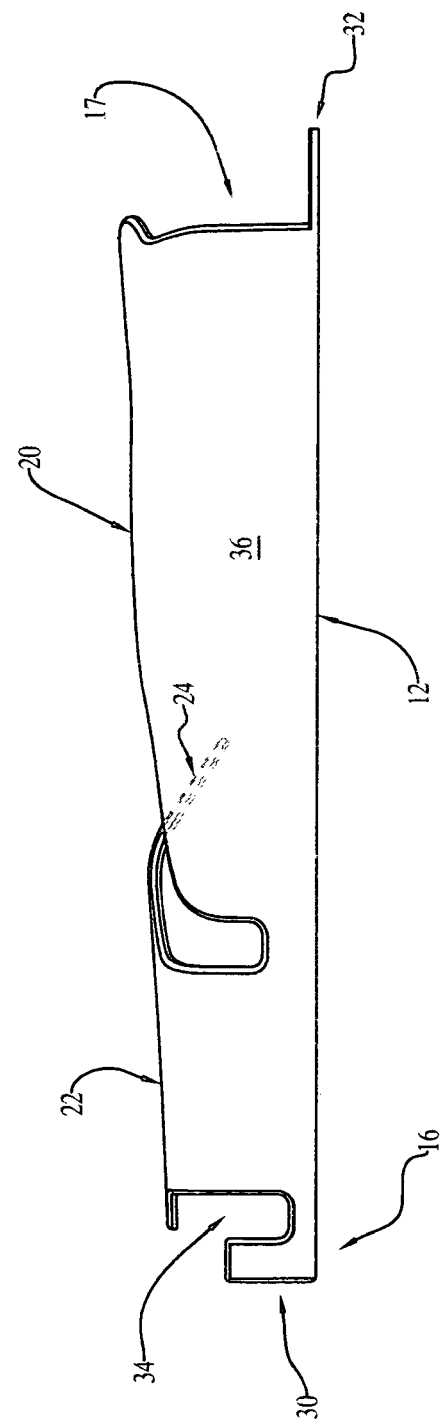

FIGS. 3A and 3B show comparative side views of the device 10. Although not shown in these side views, it is preferred that the second portion 22 of the upper wall bear raised ribs or texturing, perhaps along the sides of the device 10, in order to assist the angler in keeping a firm grip while measuring a fish. The side walls 36 may bear a void 33 at a generally central location generally adjacent the tab 24. A gap 34 may be formed between the second portion 22 of the upper wall and the stop 30. In FIG. 3A, the pliable tab 24 extends from the second portion 22 of the upper wall and is in its standard (undeflected) position. FIG. 3B, in contrast, shows the device 10 with its pliable tab 24 in a downwardly-deflected position.

Figure 4:
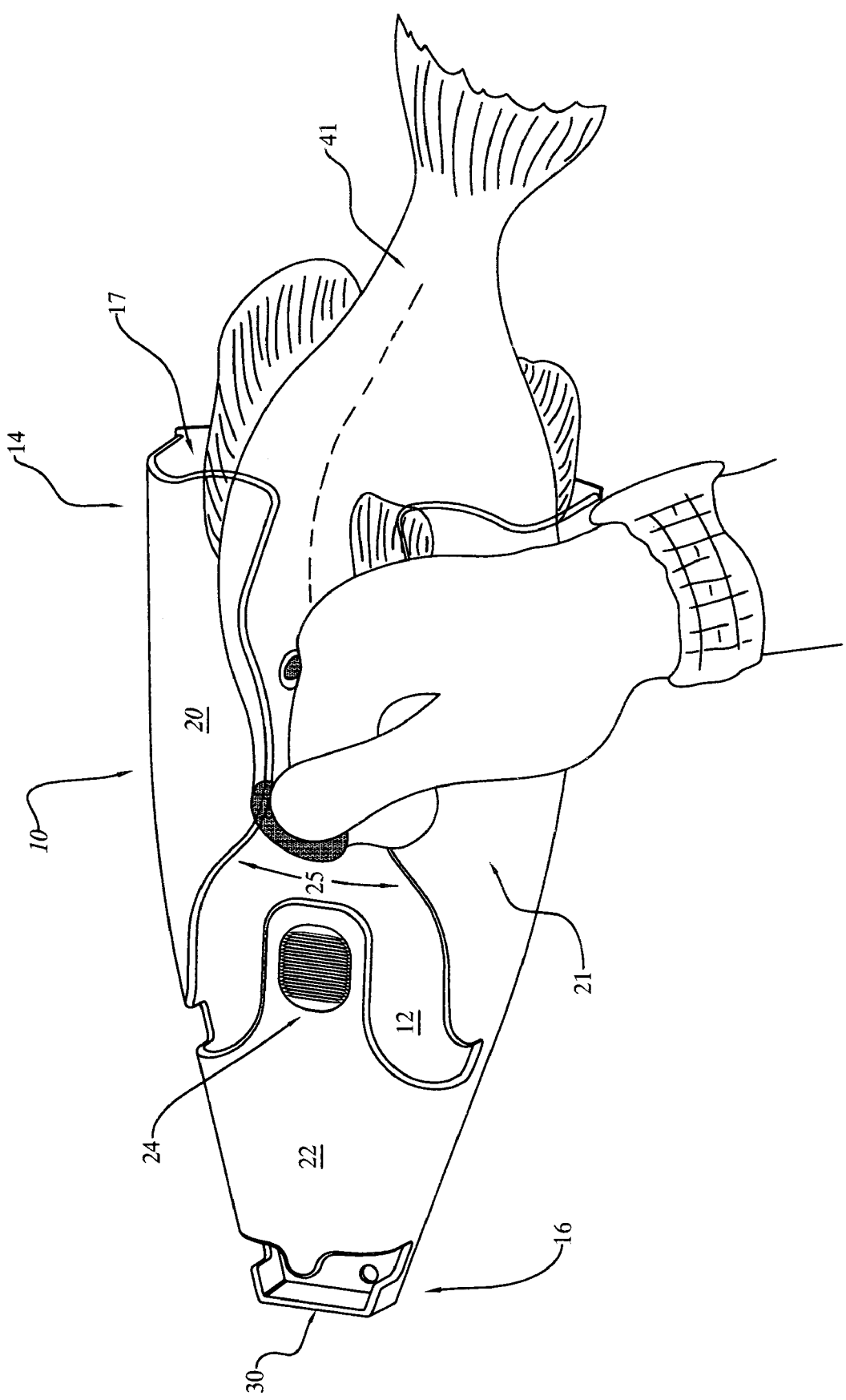
FIG. 4 is a perspective view showing a fish being inserted head-first into the fish measuring device.

FIG. 4 is a perspective view showing a fish 41 being inserted head-first into the opening at the first end 14 of the device 10. The unique configuration of the device 10 allows one to move the fish 41 from the first end 14 toward the second end 16 by gently urging the fish 41 manually through the channel 25. The channel 25 functions as a guide for one's fingers and thumbs as one moves the fish 41 along the base 12 of the device 10 until it abuts the stop 30.

Still referring to FIG. 4, the opening 17 should be sufficiently broad so to ease the task of inserting the fish 41 into the device 10. In preferred embodiments, the space between the second portions 22 of the upper wall 21 and the base 12 becomes narrower toward the stop 30, mimicking a funnel-type effect wherein the second portions 22 of the upper wall 21 function as funnel-arms having thumb-guides (i.e., the Channel 25) passing through the unique funnel-arms.

Figure 5:
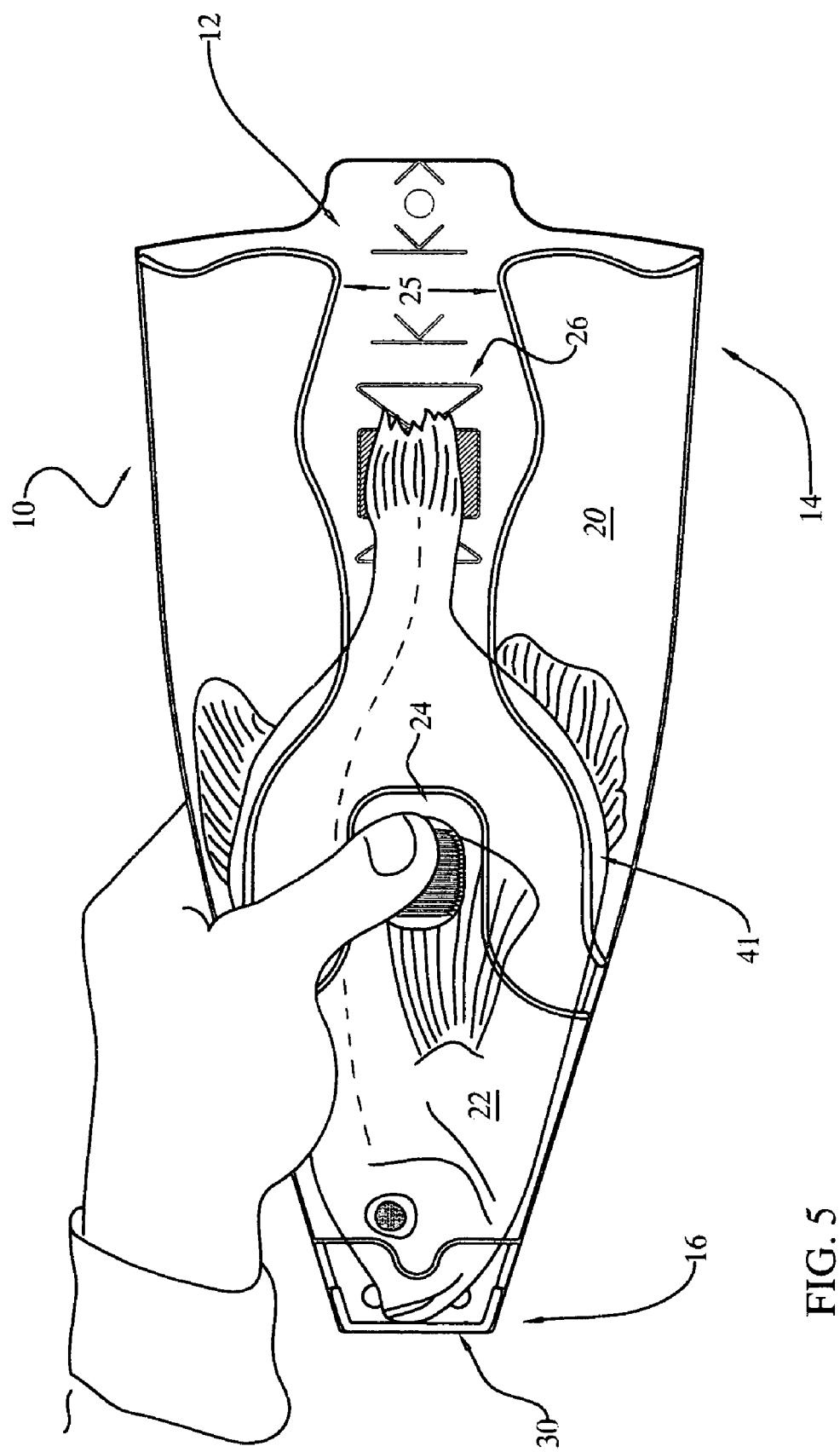
FIG. 5 shows the measuring device with a fish fully inserted therein.

FIG. 5 shows the fish 41 in its fully-inserted position wherein it abuts the stop 30 at the first end 16 of the device 10. In this fully-inserted position, the tab 24 can be depressed into gentle engagement with the fish 41 so that it can be retained within the device 10 and restrained to enable a measurement. As shown in FIG. 5, the base 12 includes marks 26 at preselected distances from the stop 30, which enable accurate visual measurement of the length of the fish 41.

If the fish 41 meets the length standards imposed by rule or regulation, then the fish 41 may be gently placed into a live well (not shown) by releasing the tab 24 and inverting the device 10. Conversely, if the fish 41 fails to meet the length standards, it may released back into open water by performing the same steps.

Although the invention and drawings are described in detail, this description has been made for illustrative and example purposes only. The scope and breadth of the described invention is limited only by the terms of the appended claims.

My invention is:

1. A device for measuring a fish, the device comprising:
   a base providing a fish-support surface and a tapered width along a longitudinal axis such that its first end of the base is broader than the second end of the base;
   a stop adjacent the second end of the base;
   a pair of side walls, each respective side wall extending upwardly from a respective side edge of the base, each side wall terminating in an upper wall generally parallel to and displaced from the base to form a space therebetween, the space being formed to enable the fish to fit in the space;
   the upper wall bearing a first portion positioned to extend over an area adjacent the first end of the base and a second portion positioned to extend over an area adjacent the second end of the base;
   an opening at the first end of the base;
   a channel extending from the opening and through the first portion of the upper wall and generally parallel the longitudinal axis;
   a pliable tab extending from the second portion of the upper wall and into the channel;
   wherein, the fish is inserted into the opening, then manually urged through the channel until the fish abuts the stop;
   and whereupon, the pliable tab may be downwardly depressed to engage and restrain the fish enable an accurate measurement.

2. The device as in claim 1, further comprising at least one mark on the base, each at least one mark positioned at preselected distances from the stop.

3. The device as in claim 1, further comprising a plurality of marks on the base, each mark positioned at a preselected distance from the stop.

4. The device as in claim 1, further including a gap between the second portion of the upper wall and the stop.

5. The device as in claim 1, wherein the device is substantially transparent.

6. The device as in claim 1, wherein the device comprises a plastic.

7. The device as in claim 1, the stop bearing a generally linear configuration substantially perpendicular the longitudinal axis.

8. The device as in claim 1, further comprising at least one hole in the base.

9. The device as in claim 8, wherein at least one hole is positioned adjacent the stop.

10. The device as in claim 1, further comprising a flap extending from the first end of the base.

11. The device as in claim 10, further comprising an aperture in the flap.

12. A method of measuring a fish, the method including the steps of providing a fish-support surface comprising a base with a tapered width along a longitudinal axis such that its first end of the base is broader than the second end of the base;

positioning a stop adjacent the second end of the base;

extending a pair of side walls upwardly from the base such that each respective side wall emanates from a respective side edge of the base and terminates in an upper wall generally parallel to and displaced from the base to form a space therebetween;

forming the upper wall to include
- a first portion that extends over an area adjacent the first end of the base; and,
- a second portion positioned to extend over an area adjacent the second end of the base and toward the first portion providing an opening at the first end of the base;

forming a channel on the first portion of the upper wall to extend from the opening and generally parallel the longitudinal axis;

a pliable tab extending from the second portion of the upper wall and into the channel;

inserting the fish into the opening;

urging the fish through the channel until the fish abuts the stop;

depressing the pliable tab downwardly to engage and restrain the fish;

determining a length of the fish.

13. The method as in claim 12, further comprising the steps of making at least one mark on the base;

positioning each at least one mark at preselected distances from the stop.

14. The method as in claim 12, further including the step of forming a gap between the second portion of the upper wall and the stop.

15. The method as in claim 12, further comprising the step of making at least one hole in the base.

16. The method as in claim 15, further comprising the step of allowing fluid to drain through the at least one hole in the base.

17. The method as in claim 12, further comprising the steps of extending a flap from the first end of the base; and, placing an aperture in the flap; and, hanging the device by engaging a hanger within the aperture.

18. A device for measuring a fish, the device made so that it includes a substantially transparent plastic and comprises:

- a base providing a fish-support surface and a tapered width along a longitudinal axis such that its first end of the base is broader than the second end of the base;
- a stop adjacent the second end of the base, the stop bearing a generally linear configuration that is generally perpendicular the longitudinal axis;
- a plurality of marks on the base, each mark positioned at a preselected distance from the stop;
- a flap extending from the first end of the base;
- an aperture in the flap;
- a pair of side walls, each respective side wall extending upwardly from a respective side edge of the base, each side wall terminating in an upper wall generally parallel to and displaced from the base to form a space therebetween, the space being formed to enable the fish to fit in the space;
- the upper wall bearing a first portion positioned to extend over an area adjacent the first end of the base and a second portion positioned to extend over an area adjacent the second end of the base;
- a gap between the first portion of the upper wall and the stop;
- an opening at the first end of the base;
- a channel extending from the opening and through the second portion of the upper wall and generally parallel the longitudinal axis;
- a pliable tab extending from the second portion of the upper wall and into the channel;
- wherein, the fish is inserted into the opening, then manually urged through the channel until the fish abuts the stop;
- and whereupon, the pliable tab may be downwardly depressed to engage and restrain the fish to enable an accurate measurement.

* * * * *